(12) United States Patent
Kang

(10) Patent No.: US 11,027,520 B2
(45) Date of Patent: Jun. 8, 2021

(54) METHOD OF WRAPPING MICA PAPER ON AN ELECTRICAL CONDUCTOR AND MICA PAPER TAPE SUITABLE FOR SAME

(71) Applicant: DUPONT SAFETY & CONSTRUCTION, INC., Wilmington, DE (US)

(72) Inventor: Byoung Sam Kang, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 200 days.

(21) Appl. No.: 15/928,420

(22) Filed: Mar. 22, 2018

(65) Prior Publication Data

US 2018/0211745 A1 Jul. 26, 2018

Related U.S. Application Data

(62) Division of application No. 15/146,077, filed on May 4, 2016, now Pat. No. 9,972,419.
(Continued)

(51) Int. Cl.
*B32B 7/06* (2019.01)
*H01B 3/04* (2006.01)
(Continued)

(52) U.S. Cl.
CPC ............ *B32B 7/02* (2013.01); *B32B 7/06* (2013.01); *B32B 27/36* (2013.01); *H01B 3/04* (2013.01); *H01B 3/421* (2013.01); *H01B 3/485* (2013.01); *B32B 2262/0253* (2013.01); *B32B 2262/0261* (2013.01); *B32B 2262/0269* (2013.01);
(Continued)

(58) Field of Classification Search
CPC .. B32B 7/02; B32B 27/36; B32B 7/06; B32B 2262/0253; B32B 2262/0261; B32B 2262/0269; B32B 2262/0276; B32B 2262/10; B32B 2262/101; B32B 2262/108; B32B 2262/14; B32B 2307/206; B32B 2307/54; B32B 2307/748; B32B 2457/00; B32B 2405/00; B32B 5/022; B32B 5/024; B32B 9/047; B32B 9/06; B32B 29/002; B32B 19/02; B32B 37/12; H01B 3/421; H01B 3/04; H01B 3/485; H01B 7/0241; H01B 7/40; H01B 13/08;
(Continued)

(56) References Cited

U.S. PATENT DOCUMENTS 2,868,269 A * 1/1959 Letteron .............. C04B 41/009
442/281
2,988,782 A 6/1961 Esperanza et al.
(Continued)

*Primary Examiner* — John D Freeman

(57) ABSTRACT

A tape having a first face comprising a continuous surface of mica paper and a second face comprising a support layer, wherein the mica paper comprises 70 to 99 weight percent mica and 1 to 30 weight percent binder and the support layer comprises a film, a paper, a nonwoven fabric, or a woven fabric; wherein the initial elongation of the support layer is equal to or less than the initial elongation of the mica paper; and wherein the support layer is demountably attached to the mica paper such that when a delamination force of 10 N/10 mm or less is imposed on the support layer it can be separated from the mica paper.

5 Claims, 1 Drawing Sheet

Related U.S. Application Data

(60) Provisional application No. 62/174,549, filed on Jun. 12, 2015.

(51) Int. Cl.
*H01B 3/48* (2006.01)
*B32B 27/36* (2006.01)
*H01B 3/42* (2006.01)
*B32B 7/02* (2019.01)

(52) U.S. Cl.
CPC ... *B32B 2262/0276* (2013.01); *B32B 2262/10* (2013.01); *B32B 2262/101* (2013.01); *B32B 2262/108* (2013.01); *B32B 2262/14* (2013.01); *B32B 2307/206* (2013.01); *B32B 2307/54* (2013.01); *B32B 2307/748* (2013.01); *B32B 2457/00* (2013.01); *Y10T 428/31725* (2015.04)

(58) Field of Classification Search
CPC ....... Y10T 428/31725; Y10T 442/3935; Y10T 428/251; H02K 3/40; H02K 15/105; H02K 3/30
See application file for complete search history.

(56) References Cited

U.S. PATENT DOCUMENTS

| | | | |
|---|---|---|---|
| 2,999,788 A | 9/1961 | Winthrop | |
| 3,063,966 A | 11/1962 | Kwolek et al. | |
| 3,101,845 A * | 8/1963 | Heasley | H02K 3/34 428/40.4 |
| 3,227,793 A | 1/1966 | Cipriani | |
| 3,287,324 A | 11/1966 | Sweeny | |
| 3,414,645 A | 12/1968 | Morgan | |
| 3,623,924 A | 11/1971 | Winter et al. | |
| 3,767,756 A | 10/1973 | Blades | |
| 3,869,429 A | 3/1975 | Blades | |
| 3,869,430 A | 3/1975 | Blades | |
| 4,060,451 A * | 11/1977 | Uchiyama | C04B 18/022 162/157.3 |
| 4,606,785 A | 8/1986 | Zeise | |
| 4,704,322 A | 11/1987 | Roberts | |
| 5,618,891 A | 4/1997 | Markovitz | |
| 5,667,743 A | 9/1997 | Tai et al. | |
| 6,991,845 B2 * | 1/2006 | Levit | B32B 7/02 174/110 R |
| 2003/0035960 A1 | 2/2003 | Tsunoda et al. | |
| 2013/0196161 A1* | 8/2013 | Kang | H01B 3/04 428/414 |

* cited by examiner

METHOD OF WRAPPING MICA PAPER ON AN ELECTRICAL CONDUCTOR AND MICA PAPER TAPE SUITABLE FOR SAME

BACKGROUND OF THE INVENTION

Field of the Invention

The present invention relates to a method of applying a mica paper as insulation to an electrical conductor and a mica paper tape useful in such method.

Description of the Related Art

High mica-content papers are useful as insulation in motors, generators and inverters. Mica papers with higher content mica typically have a mechanical supporting layer such as a glass cloth or polyester film to compensate for mechanical weakness in the mica paper associated with the high mica content. However the mechanical supporting layer is undesirable in use in electrical equipment because many insulation failures are attributable to that mechanical support layer and its lower corona resistance, different thermal expansion, and different conductivity.

It is common to spirally or helically wrap electrical insulation, in the form of a tape, around a conductor using a machine especially designed to maintain the tension on the tape while rapidly wrapping the tape around the conductor. These machines generally require the use of mica paper tapes with a mechanical supporting layer, therefore the mechanical supporting layer with its less than desirable electrical performance becomes a part of the insulation.

Therefore there is a need for a method of successfully wrapping a mica paper around an electrical conductor wherein it is not required to include the mechanical supporting layer in the electrical insulation.

SUMMARY OF THE INVENTION

This invention relates to a method of applying a mica paper around an electrical conductor, the process including
 i) a tape, the tape having a face comprising a continuous surface of the mica paper and a face comprising a support layer, the support layer being demountably attached to the mica paper; and
 ii) an electrical conductor, the conductor having a surface having a length and a circumference perpendicular to that length;
the method comprising the steps, in order, of:
 a. attaching the face of the tape comprising the continuous surface of mica paper to the conductor at an attachment point on the surface of the conductor;
 b. winding the tape around the conductor, the mica paper being in contact with the conductor surface, until the tape has been wound to a point of winding that is at least 25 percent of the conductor circumference from the attachment point on the surface of the conductor; and then
 c. initiating a continuous removal of the support layer from the tape, starting at the attachment point, the mica paper remaining in contact with the surface of the conductor; and
 d. continuing to wind the tape around the conductor, the mica paper being in at least partial contact with the conductor surface and continuously contacting the surface at a winding point, while simultaneously removing the support layer at a removal point until a desired amount of conductor surface is completely covered with at least one layer of the mica paper,
with the proviso that the removal point is maintained at least 25 percent of the conductor circumference behind the winding point until the desired amount of conductor surface is completely covered.

This invention also relates to a tape having a first face comprising a continuous surface of mica paper and a second face comprising a support layer, wherein the mica paper comprises 70 to 99 weight percent mica and 1 to 30 weight percent binder and the support layer comprises a film, a paper, a nonwoven fabric, or a woven fabric; wherein the initial elongation of the support layer is equal to or less than the initial elongation of the mica paper; and wherein the support layer is demountably attached to the mica paper such that when a delamination force of 10 N/10 mm or less is imposed on the support layer it can be separated from the mica paper.

DETAILED DESCRIPTION OF THE INVENTION

Figure 1:
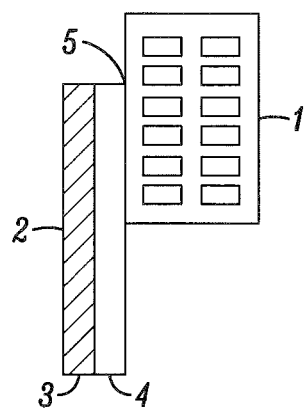
FIGS. 1-4 illustrate certain aspects of the method of applying an insulation tape to a conductor having a rectangular cross section.

This invention relates to a method of applying insulation to an electrical conductor with use of mica paper in combination with a peelable support layer. Such peelable support layer is temporarily used to support the mica paper under tension during a winding process along a length of an electrical conductor and then the peelable support layer is removed as taping along an electrical conductor proceeds. This method can result with only mica paper wrapped on the conductor without any other additional layer present.

The mica papers are useful in many kinds of electrical components but more particularly in rotating equipment such as low voltages (nominal voltage below 1000 V). Examples of electrical components include motors, generators and invertors. A preferred electrical conductor is a coil to which mica paper is applied. The mica application method is useful for electrical insulation having properties of thermal stability and corona discharge resistance while retaining acceptable mechanical strength.

Mica paper as used herein means a paper containing the inorganic material mica. Illustratively the mica content can be at least 45% by weight; however, the most useful electrical properties are present when the mica paper has at least 70% by mica, and preferably when the mica paper has at least 85 or 90 percent by weight mica. The term "mica", as used herein, is used in its conventional meaning directed to form of a silicate mineral. Mica particles, normally in the form of a flake of various types, such as muscovite or phlogopite or blends thereof, can be used; however, mica of the muscovite type is preferred. A preferred type of mica for electrical insulation is muscovite with optionally phlogopite present.

As the mica content in a paper increases the mechanical strength and cohesiveness of the paper generally decreases. Additives such as binders typically add mechanical strength to the papers but such additives decrease as the mica content increases.

A preferred method of applying a mica paper with a peelable layer to an electrical conductor is through use of a high speed machine for wrapping a material around a surface. Such high speed machines are well known. However it is understood that the method disclose herein can be done by hand, which means a person would apply and wrap the mica paper around and along an electrical conductor.

As employed herein, the term peelable support layer denotes that such support layer can be removed, i.e. separated, by hand or machine from a mica paper. A person holding a roll of the mica paper contacting the peelable support layer is able to remove the peelable support layer without damaging the mica paper. As such, the support layer is said to be demountably attached to the mica paper. By demountably attached it is meant the support layer is peelable from the mica paper, such that when a delamination force of 10 N/10 mm or less is imposed on the support layer it can be separated from the mica paper.

Further, the initial elongation of the support layer is equal to or less than the initial elongation of the mica paper. The inventors have found that surprisingly if the support layer has more elongation or stretch than the mica paper, it is difficult to remove the support layer from the mica paper without tearing the mica paper.

Suitable examples of a peelable layer include a film, a paper, a nonwoven fabric, or a woven fabric; specific examples include cellulosic paper, polymeric film, woven textile, nonwoven structure, aramid paper and metal foil.

This invention relates to a method of applying a mica paper around an electrical conductor, the process including
  i) a tape, the tape having a face comprising a continuous surface of the mica paper and a face comprising a support layer, the support layer being demountably attached to the mica paper; and
  ii) an electrical conductor, the conductor having a surface having a length and a circumference perpendicular to that length;
the method comprising the steps, in order, of:
  a. attaching the face of the tape comprising the continuous surface of mica paper to the conductor at an attachment point on the surface of the conductor;
  b. winding the tape around the conductor, the mica paper being in contact with the conductor surface, until the tape has been wound to a point of winding that is at least 25 percent of the conductor circumference from the attachment point on the surface of the conductor; and then
  c. initiating a continuous removal of the support layer from the tape, starting at the attachment point, the mica paper remaining in contact with the surface of the conductor; and
  d. continuing to wind the tape around the conductor, the mica paper being in at least partial contact with the conductor surface and continuously contacting the surface at a winding point, while simultaneously removing the support layer at a removal point until a desired amount of conductor surface is completely covered with at least one layer of the mica paper,
with the proviso that the removal point is maintained at least 25 percent of the conductor circumference behind the winding point until the desired amount of conductor surface is completely covered.

The face of the tape comprising the continuous surface of mica is attached to the conductor at an attachment point the surface of the conductor. This can be achieved by applying a front edge or end of the tape to the electrical conductor wherein the front edge or end of the continuous surface of the mica paper adheres to the conductor by use of an adhesive either (i) on the electrical conductor or (ii) on the front edge or end of the surface of the mica paper. It is understood that in all cases an adhesive need not be on an edge, the front edge of the conductor, but will be on the end of the mica paper which contacts the electrical conductor. It is necessary for the mica paper to remain in contact with the electrical conductor as winding tension is applied to the tape.

The tape is then wound around the conductor, the mica paper being in contact with the conductor surface, until the tape has been wound to a point of winding that is at least 25 percent of the conductor circumference from the attachment point on the surface of the conductor; and then initiating a continuous removal of the support layer from the tape, starting at the attachment point, the mica paper remaining in contact with the surface of the conductor. The continuous removal of the support layer can be initiated when there is this distance between the initial attachment point and the winding point because the conductor being wrapped provides adequate support of the mica paper on the conductor. A distance between the initial attachment point (or the removal point) and the winding point of at least 25 percent of the conductor circumference is the minimum practical distance, and is useful when the conductor has generally a round or oval cross sectional shape. In one embodiment, the distance between the initial attachment point (or the removal point) and the winding point is at least 50 percent of the conductor circumference. This is especially is preferred when the conductor has a generally square or rectangular cross sectional shape. This allows the tape to be wrapped around a rectangular corner of the conductor to provide additional support prior to the removal of the support layer.

Figure 2:
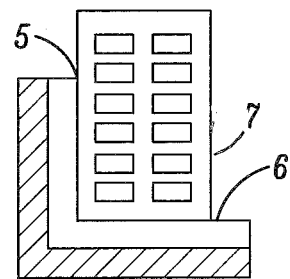
Figure 3:
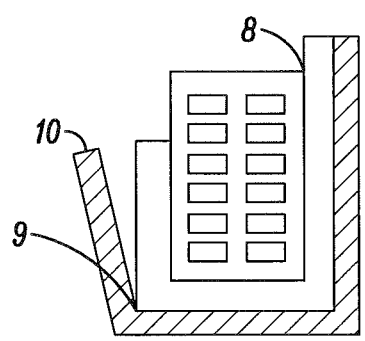
Figure 4:
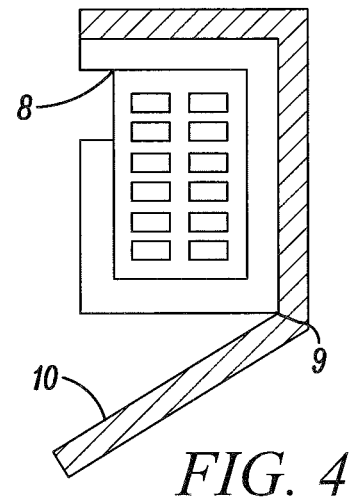

The wrapping technique on a conductor of rectangular cross section is illustrated in FIGS. 1-4. Referring to FIG. 1, electrical insulation tape 2 having a support layer 3 and mica paper 4 is shown attached to conductor 1. The end of the insulation tape forms attachment point 5 on the surface of the conductor. In FIG. 2, the tape is wound around the conductor, and as it is wound, the leading edge of the contact between the tape and the conductor is the winding point 6. As indicated, the point 7 on the conductor is the point 50% of the conductor circumference from the attachment point 5, at which point the support layer can start to be removed from the mica paper at the attachment point 5. In FIG. 3, the winding has progressed, with the winding point now shown at 8, and the removal point 9 being 50% of the conductor circumference behind the winding point. The support layer 10 has now been peeled from the mica paper from the initial attachment point to the removal point 9. FIG. 4 further illustrates the wrapping, with the winding point 8 and removal point 9 having progressed around the surface of the conductor. The wrapping continues around the conductor in this manner.

The maximum distance between the attachment point (or removal point) and the winding point is necessarily less than 100 percent of the circumference of the conductor, otherwise the support layer would be wound onto the conductor. From a practical sense, it is believed practical maximum distance between the attachment point (or removal point) and the winding point is 90% percent of the circumference of the conductor.

The method continues by continuing to wind the tape around the conductor, the mica paper being in at least partial contact with the conductor surface and continuously contacting the surface at a winding point, while simultaneously removing the support layer at a removal point until a desired amount of conductor surface is completely covered with at least one layer of the mica paper, with the proviso that the removal point, where the support layer is removed from the mica paper, is maintained at least 25 percent of the conductor circumference behind the winding point until the desired amount of conductor surface is completely covered.

Preferably the tape is helically or spirally wound around the conductor. Further, preferably at least a portion of the tape is wound with one layer of mica paper at least partially overlapping a prior-wrapped mica paper layer. Typically an overlap of the wrapped tape is preferred, with an overlap of about 50% of the width of the tape being most preferred.

For the purposes herein, the words "surface of conductor" is meant to include the outer surface of an electrical conductor wherein an insulation wrap is desired. The "surface of the conductor is not limited to only a bare metal surface of the conductor, but is understood to also include the outer surface of a conductor that might have had a coating on the metal surface or other material applied to the metal surface, or even another form of insulation applied to the conductor.

One preferred tape for winding on conductors is a tape having a layer of continuous mica paper in combination with a peelable support layer. That is, a tape having a first face comprising a continuous surface of mica paper and a second face comprising a support layer, wherein the mica paper comprises 70 to 99 weight percent mica and 1 to 30 weight percent binder and the support layer comprises a film, a paper, a nonwoven fabric, or a woven fabric; wherein the initial elongation of the support layer is equal to or less than the initial elongation of the mica paper; and wherein the support layer is demountably attached to the mica paper such that when a delamination force of 10 N/10 mm or less is imposed on the support layer it can be separated from the mica paper.

In some preferred embodiments, the layer of mica paper has 90 to 99 weight percent mica, and in some specialized embodiments the mica paper had 95 to 99 weight percent mica. The mica paper can contain one or more additives. Typically such additives include the binder to add cohesive strength to the mica paper, and other materials such as fibers or floc.

In some embodiments the mica paper further includes cellulose, acetate, acrylic, polyolefin, polyamide, polyester fiber, glass fiber, rock wool, polycrystal fiber like alumina, monocrystal like potassium titanate, or mixtures thereof. In some preferred embodiments the binder in the mica paper includes aramid fibrids. In some preferred embodiments the mica paper includes aramid floc. One especially preferred embodiment is the use of aramid fibrids and floc made from poly(metaphenylene isophthalamide).

The term floc, as used herein, means fibers that have a short length and that are customarily used in the preparation of wet-laid sheets and/or papers. Typically, floc has a length of from about 3 to about 20 millimeters. A preferred length is from about 3 to about 7 millimeters. Floc is normally produced by cutting continuous fibers into the required lengths using well-known methods in the art.

The term aramid, as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide)(MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc could be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly(paraphenylene terephthalamide); and one preferred para-aramid copolymer is copoly(p-phenylene/3,4'diphenyl ester terephthalamide). The preferred aramid floc is a meta-aramid floc, and especially preferred is floc made from the meta-aramid poly(meta-phenylene isophthalamide)(MPD-I).

The term fibrids, as used herein, means very small, nongranular, fibrous or film-like particles with at least one of their three dimensions being of minor magnitude relative to the largest dimension. These particles are prepared by precipitation of a solution of polymeric material using a non-solvent under high shear, as disclosed for example in U.S. Pat. Nos. 2,988,782 and 2,999,788. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

In the event a combination of floc and fibrid is employed for the aramid, a preferred weight ratio of floc to fibrid is in a range from 0.5 to 4.0 and more preferably 0.8 to 2.0.

The mica paper can be made from a plurality of thin planar webs attached together. As used herein, the term "face" refers to either of the two major surfaces of the layer or paper (i.e., one side or the other of the layer or paper).

If the mica paper is too thick, it will interfere with the winding process. Preferably the mica paper will not be greater than 750 micrometers and more generally not greater than 500 micrometers. In some other embodiments the mica paper has a thickness of 250 micrometers or less. In one preferred embodiment the mica paper has a thickness of 130 micrometers or less; still other preferred embodiments have a thickness of 100 millimeters or less.

The mica paper can be made on a paper-making machine by providing the desired amount and proportion of mica and/or aramid solids to the headbox and then wet-laying as a web onto a papermaking wire. The wet web can then be dried on dryer drums to form a paper. Preferably the paper is then further calendared in the nip of a hot roll calendar under pressure and heat, or by other means, to consolidate and densify the paper into a layer having the desired thickness. If desired, two or more lighter basis weight or thinner wet webs of the same composition can be made separately and then calendared and consolidated together into a single layer.

The support layer is demountably attached to the mica paper such that when a delamination force of 10 N/10 mm or less is imposed on the support layer it can be separated from the mica paper. The support layer can be demountably attached to the mica paper via a suitable adhesive that has cohesive or adhesive failure when a delamination force of 10 Newtons per 10 millimeters of width is placed on the adhesive at room temperature. This peel force or delamination force can be determined by measuring the force to pull the support layer from the mica paper at room temperature (20° C.) in a suitable measuring device such as an Instron®. To measure the delamination force, the support layer is initially separated from the mica paper, and the individual support layer and mica paper are placed in the opposing jaws of the Instron® (that is, a peel angle of 180°) and the force needed to separate the two layers is measured at a speed of 100 mm/min.

Any adhesive that will both attach the support layer to the mica paper and then also allow the support layer to be peeled from the mica paper when a delamination force of 10 Newtons per 10 millimeters of width is placed on the adhesive can be used. The inventors have found that a light application of Scotch® brand Spray Mount adhesive is a suitable adhesive, but other types of adhesives and amounts of adhesives could be used.

To create a tape having a support layer is demountably attached to a mica paper layer, it is convenient to apply a suitable adhesive to a face of the support layer and then apply a face of the mica paper to the adhesive; or alternatively, apply a suitable adhesive to a face of the mica paper and then apply a face of the support layer to the adhesive. The inventor has found that one suitable peelable support layer is a polyethylene coated polyester film having a nominal thickness of 0.0254 mm (sold under the Mylar® trademark by DuPont). Other materials that are suitable as a support layer include a paper, a nonwoven fabric, or a woven fabric.

One method of applying the adhesive is to apply a spray a light even coat of adhesive one face of the support layer from a distance of about 6 to 8 inches. If necessary, the adhesive is then allowed to dry for a short time (up to 1 to 5 minutes) before the mica paper was then applied to the adhesive. The thickness of the adhesive on the support layer is preferably 0.05 to 0.030 mm.

Additionally the two layers with the adhesive between can be pressed together, for example using a calendar nip, at a suitable pressure (preferably up to about 5.5 MPa) to product a final tape having the support layer demountably attached to the mica paper.

In addition it is preferable that the support layer should be able to withstand a tensile force of at least 60 Newtons per 10 millimeters of width to ensure adequate tensioning of the mica paper and the support layer during the wrapping of the conductor. In some instances it is adequate they withstand a tensile force of at least 50 Newtons per 10 millimeters of width. Adequate tensioning of the tape and two layers is preferred to help avoid undesirable creases or wrinkles during winding. Further, for useful wrapping of conductors with tapes of the multilayer laminate structure, the laminate structure should preferably have a flexibility or stiffness of less than about 100 N/m, preferably less than about 50 N/m for use in high-speed machine tape-wrapping processes.

Test Methods

Basis Weight is measured according to ASTM D 645 and ASTM D 645-M-96 and reported in g/m².

Thickness is measured according to ASTM D 646-96 and reported in mm.

Tensile Strength and initial elongation is measured according to ASTM D 828-93 with 2.54 cm wide test specimens and a gage length of 18 cm and reported in MPa.

Dielectric Strength is measured according to ASTM D 149-97A and reported in kV/mm.

Delamination Force (or Peel Adhesion) is measured according to ASTM D 3330 Method F and reported in N/10 mm.

Stiffness (flexibility) or the bending resistance is the maximum flexural load to bend a specimen divided by the length of test specimen (15 mm wide by 200 mm long) in accordance with IEC 60371-2 and reported in N/m.

EXAMPLES

Example 1

A tape of mica paper with a peelable support layer was prepared by laminating one mica paper layer with one mechanical supporting layer. The mica paper layer was made of 95% by weight mica (SRF-105T) from SWECO inc. (Korea) and 5% by weight meta-aramid fibrids. The mechanical supporting (peelable) layer was a polyester film (Mylar® DuPont) having a 0.0254 mm thickness. To create instant, repositionable sticky surface on the polyester film, Scotch® Spray Mount™ adhesive was applied on one face of the polyester film. A light even coat of adhesive was sprayed for 5 to 10 seconds from a distance of 6 to 8 inches from surface of the film and let dry for one minute. The thickness of this adhesive layer on the polyester film is approximately 0.020 mm. The mica paper layer was laid on this sprayed adhesive surface of the polyester film the layers combined under a calendar nip pressure of 5.5 MPa to form a laminate structure. Then the laminate structure was slit into 15 mm wide tape.

Comparative Example A

A commercial grade calcined mica paper (SRF-105T) was prepared from SWECO Inc. (Korea). This mica paper was composed of 95% of calcined mica and 5% meta-aramid fibrids as a precursor of commercial glass backsheet and polyester film backed mica paper. This mica paper was slit into 15 mm wide tape. Properties of the resulting this tape are listed in the Table. Due to low mechanical strength, tapes kept breaking no matter what unwinding/rewinding tension was set.

Example 2

A conductor was spirally wrapped with the tape of Example 1 in the following manner. The cross sectional size of the rectangular conductor tested was 150 mm by 75 mm. At the starting point of the winding of this tape, the mica paper surface was fixed with polyimide film tape (Nitto Denko P-224 AMB) on the aluminum conductor surface. The tape was wrapped onto two sides of the conductor until 50% of the circumference of the rectangular aluminum conductor was covered, and then the initiation of the peeling of the support layer from the mica paper was begun. The spiral wrapping of the conductor proceeded, with the next spiral wound around the conductor covering 50% of the prior wrapping (50% overwrap or half wrapping). Tension was applied to the tape as needed up to 40 N per 10 mm of width to remove visible wrinkles and creases. A layer of mica paper was successfully wrapped on the conductor. The angle between mica paper and support layer while the support layer was being removed was about 90 degrees. Properties of the resulting tape are listed in the Table.

Example 3

A tape of mica paper on a peelable support layer was prepared as in Example 1 and again wound on a rectangular conductor as in Example 2, however the conductor was a smaller rectangular copper conductor having a cross sectional dimension of 13.3 mm by 3.3 mm. A slightly higher tension was applied as necessary, up to 50 N per 10 mm of width, to remove visible wrinkles and creases. A layer of mica paper was successfully wrapped on the conductor. The angle between mica paper and support layer while the support layer was being removed was about 90 degrees. Properties of the resulting tape are listed in the Table.

Example 4

A tape of mica paper on a peelable support layer was prepared as in Example 1 and again wound on a conductor as in Example 2, but the conductor was an aluminum wire of round cross section having a diameter of 160 mm. In this instance, it was found that the tape only had to be wrapped onto the conductor until 25% of the circumference of the round cross section conductor prior to the initiation of the peeling of the support layer from the mica paper was begun.

Tension was applied to the tape as needed up to 40 N per 10 mm of width to remove visible wrinkles and creases. A layer of mica paper was successfully wrapped on the conductor. The angle between mica paper and support layer while the support layer was being removed was about 90 degrees. Properties of the resulting tape are listed in the Table.

TABLE

| | Before Winding (mica paper + support layer) | | | After Winding (mica only) | |
|---|---|---|---|---|---|
| | | | Thickness of bare wire | | |
| Example | Basis Weight (g/m$^2$) | Tensile Strength (MPa) | long/short side or diameter (mm) | Overall thickness (mm) | Dielectric Strength (kV/mm) |
| A | 105 | <10 | 150/75 | NA* | NA* |
| 2 | 125 | 117 | 150/75 | 150.2/75.3 | 19.1 |
| 3 | 155 | 115 | 150/75 | 133.7/3.6 | 21.2 |
| 4 | 155 | 115 | 160 | 160.2 | 22.4 |

*Tape could not be wound.

What is claimed is:

1. A tape having a first face comprising a continuous surface of mica paper and a second face comprising a support layer,
    wherein the mica paper consists of 70 to 99 weight percent mica and 1 to 30 weight percent of a binder of aramid fibrids, and optionally, additive fibers or floc;
    and the support layer comprises a film, a paper, a nonwoven fabric, or a woven fabric;
    wherein the initial elongation of the support layer is equal to or less than the initial elongation of the mica paper; and
    wherein the support layer is demountably attached to the mica paper such that when a delamination force of 10 N/10 mm or less is imposed on the support layer it can be separated from the mica paper,
    wherein the support layer can withstand a tensile force of at least 50 Newtons per 10 millimeters of width.

2. The tape of claim 1 wherein the additive fibers or floc includes aramid, cellulose, acetate, acrylic, polyolefin, polyamide, polyester, or mixtures thereof.

3. The tape of claim 2, wherein the additive fibers or floc is aramid floc.

4. The tape of claim 3, wherein the aramid fibrids and floc are made from poly(metaphenylene isophthalamide).

5. The tape of claim 1 wherein the additive fibers or floc includes glass fiber, rock wool, alumina polycrystal fiber, potassium titanate monocrystal fiber, or mixtures thereof.

* * * * *